United States Patent [19]

Watanabe et al.

[11] 4,275,953
[45] Jun. 30, 1981

[54] EXPOSURE PARAMETER INFORMATION GENERATING CIRCUIT IN A SINGLE LENS REFLEX CAMERA

[75] Inventors: Sakuji Watanabe, Warabi; Yoshiaki Ohtsubo; Kenji Toyoda, both of Kawasaki, all of Japan

[73] Assignee: Nippon Kogaku K.K., Tokyo, Japan

[21] Appl. No.: 73,449

[22] Filed: Sep. 7, 1979

[30] Foreign Application Priority Data

Sep. 14, 1978 [JP] Japan .................................. 53/113017

[51] Int. Cl.³ ............................ G03B 7/08; G03B 7/20
[52] U.S. Cl. ........................................ 354/33; 354/50; 354/286; 354/60 F; 354/149
[58] Field of Search ............. 354/33, 27, 28, 29, 354/30, 37, 38, 41, 46, 286, 60 F, 60 R, 50, 34, 139, 149

[56] References Cited

U.S. PATENT DOCUMENTS

| 3,742,828 | 7/1973 | Nakajima et al. ............... 354/33 |
| 4,095,242 | 6/1978 | Tsunekawa et al. ............ 354/33 |
| 4,101,223 | 7/1978 | Mutsushita ..................... 354/286 |
| 4,118,713 | 10/1978 | Murakami et al. ............. 354/286 X |
| 4,187,019 | 2/1980 | Uchiyama et al. .............. 354/33 |

*Primary Examiner*—George H. Miller, Jr.
*Assistant Examiner*—W. J. Brady
*Attorney, Agent, or Firm*—Fitzpatrick, Cella, Harper & Scinto

[57] ABSTRACT

In a single lens reflex camera having an interchangeable photographing lens having a first and a second signal member, the camera being usable in combination with an electronic flash unit and having a third signal member, there is provided an exposure parameter information generating circuit which comprises first converter means for converting the mechanical outputs of the first and third signal members into electrical output information, second converter means for converting the mechanical output of the second signal member into electrical output information, an adder circuit for adding the electrical outputs of the first and second converter means and putting out electrical information, a first output terminal for applying the output of the first converter means to an exposure time operation circuit, and a second output terminal for applying the output of the adder circuit to the electronic flash unit.

7 Claims, 3 Drawing Figures

EXPOSURE PARAMETER INFORMATION GENERATING CIRCUIT IN A SINGLE LENS REFLEX CAMERA

BACKGROUND OF THE INVENTION

1. Field of the Invention

This invention relates to a circuit for generating the information of exposure parameters of a single lens reflex camera.

2. Description of the Prior Art

The auto control type electronic flash unit heretofore used with a camera has made it necessary that the aperture value preset by the camera and the ASA film speed value be set by a dial or the like provided on the flash unit.

SUMMARY OF THE INVENTION

The object of the present invention is to provide a camera which eliminates the necessity of setting the aperture value and the ASA film speed value on the flash unit side.

The invention will become fully apparent from the following detailed description thereof taken in conjunction with the accompanying drawings.

DESCRIPTION OF THE PREFERRED EMBODIMENTS

Figure 1:
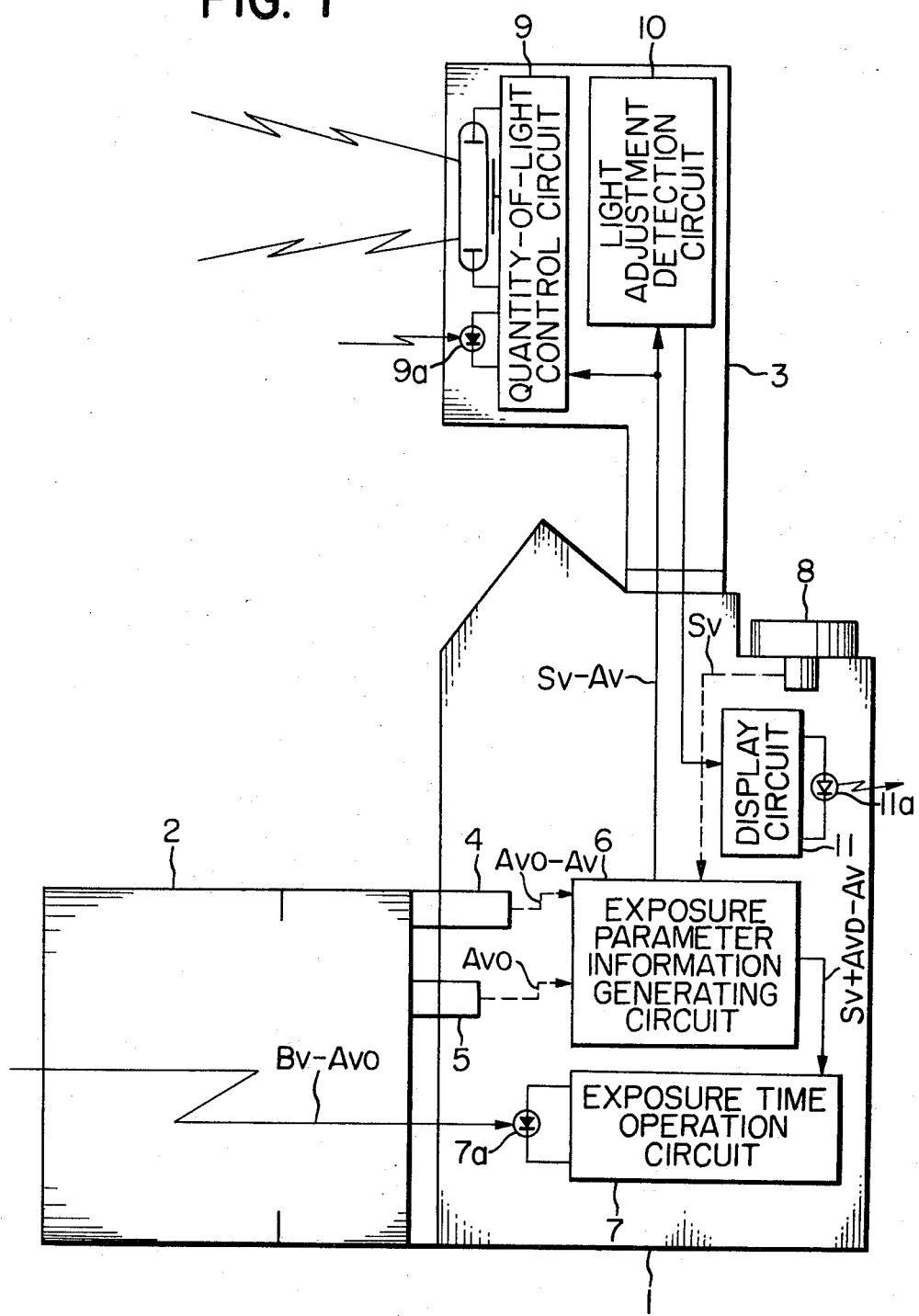
FIG. 1 is a diagrammatic view showing a single lens reflex camera body containing therein the exposure parameter information generating circuit of the present invention, an interchangeable photographing lens and an electronic flash unit mounted on the camera body.

Referring to FIG. 1, an interchangeable photographing lens 2 and an auto control type electronic flash unit 3 are mounted on a single lens reflex camera body 1.

The lens 2 has a first lever 4 for putting out the information of exposure parameter $A_{vo}-A_v$ ($A_{vo}$ is an APEX symbol representing the aperture value when the diaphragm of the lens forms a maximum aperture, namely, the maximum aperture value and $A_v$ is an APEX symbol representing an aperture value preset by a preset aperture ring provided on the lens 2; the APEX system defining these APEX symbols is standardized in ASA PH 2.12-1961), and a second lever 5 for putting out the information of exposure parameter $A_{vo}$. The second lever 5 is displaceable corresponding to $A_{vo}$ with the mounting of the lens 2 onto the camera body 1. The first lever 4 is displaceable corresponding to $A_{vo}-A_v$ with the setting operation of the preset aperture ring after said mounting.

The camera body 1 has therein an exposure parameter information generating circuit 6 and an exposure time operation circuit 7. The information of an exposure parameter $S_v$ put out in the form of an amount of displacement by rotation of a film speed setting dial provided on said camera body 1 ($S_v$ is an APEX symbol representing the ASA speed value) and the information of exposure parameters $A_{vo}-A_v$ and $A_{vo}$ put out in the form of an amount of displacement by said lens are applied to the exposure parameter information generating circuit 6. The information generating circuit 6 converts said mechanical input into electrical outputs corresponding to the exposure parameters $S_v+A_{vo}-A_v$ and $S_v-A_v$.

The exposure time operation circuit 7 receives and measures the object light passed through the maximum aperture of the photographing lens 2 by means of a light-sensing element 7a, and obtains an electrical metering output corresponding to the exposure parameter $B_v-A_{vo}$ ($B_v$ is an APEX symbol representing the object brightness, namely, the luminance value). One output $S_v+A_{vo}-A_v$ is applied from the information generating circuit 6 to the time control circuit 7 and added to the metering output $B_v-A_{vo}$. As the result, the time operation circuit 7 effects the APEX operation of $S_v+A_{vo}-A_v+B_v-A_{vo}=S_v+B_v-A_v=T_v$ ($T_v$ is an APEX symbol representing the effective exposure time, i.e. time value). The output of the operation circuit 7 is used for the exposure display and the automatic exposure time control.

The auto control type electronic flash unit 3 has a quantity-of-light control circuit 9 and a light adjustment detection circuit 10.

The quantity-of-light control circuit 9 meters the flash light reflected from the object toward the light-sensing element 9a of the circuit 9 and stops emitting the flash light at the moment when the quantity of the metered light reaches a proper exposure amount determined by the exposure parameters $S_v$ and $A_v$.

The light adjustment detection circuit 10 detects whether or not the unit can emit a proper quantity of light determined by the exposure parameters $S_v$ and $A_v$ and the distance from the unit to the object. For example, the detection circuit 10 puts out an output when the aperture of the diaphragm of the lens 2 is too small or $A_v$ is too great and a proper exposure amount cannot be provided to the film even for the maximum quantity of light of the flash unit. This output drives a display circuit 11 provided on the camera body 1 and flickers a light-emitting diode 11a connected to the circuit 11. The photographer can view the flicker of the diode 11a through the finder of the camera and can know that the aperture of said diaphragm should be made larger. The quantity-of-light control circuit 9 and the detection circuit 10 obtain the information of the exposure parameters $S_v$ and $A_v$ from the other output $S_v-A_v$ of the information generating circuit 6. Accordingly, it is not necessary to effect the setting of $S_v$ and $A_v$ on the flash unit side and the trouble during flash photography can be eliminated.

Figure 2:
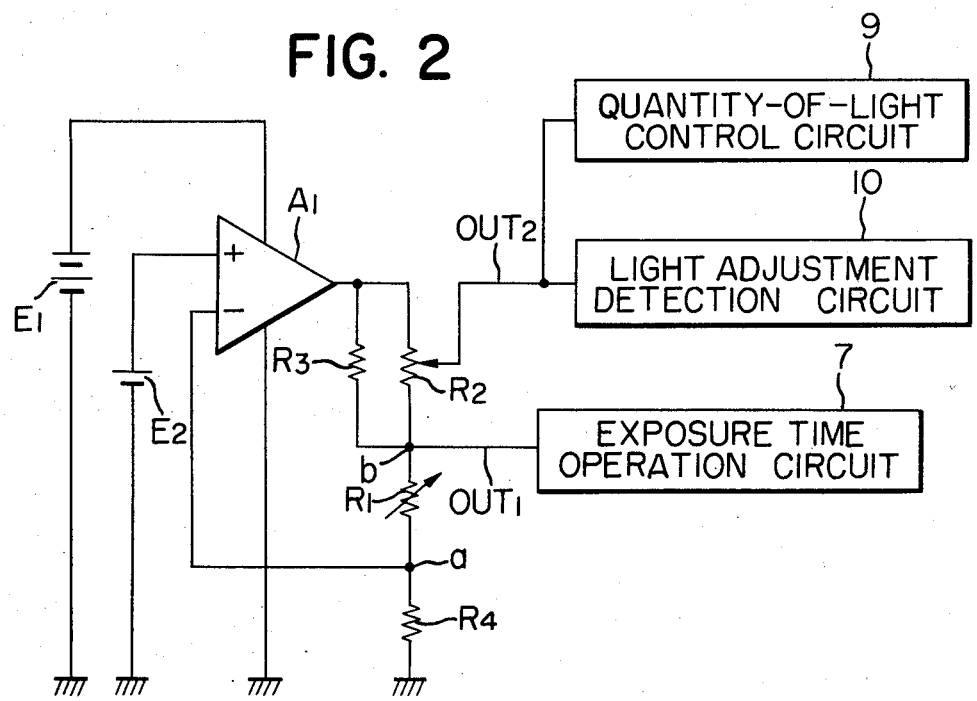
FIG. 2 is a circuit diagram showing an embodiment of the present invention.

The exposure parameter information generating circuit of the present invention will hereinafter be described with reference to the drawings. In FIG. 2, an operational amplifier (OP Amp.) $A_1$ is energized by a power source $E_1$. The non-inverting input terminal (+) of the OP Amp. $A_1$ is biased to a predetermined voltage by a standard power source $E_2$. A first variable resistor $R_1$ and a second variable resistor $R_2$ are connected in series between the inverting input terminal (−) and the output terminal of the OP Amp. $A_1$, and a correction resistor $R_3$ is parallel-connected to the second variable resistor $R_2$. A resistor $R_4$ is connected between the inverting input terminal (−) of the OP Amp. $A_1$ and the ground. By the above-described construction, a current is supplied from the output terminal of the OP Amp. $A_1$ to the resistors $R_1$-$R_4$.

The first variable resistor $R_1$ comprises a resistance element and a slider. The resistance element itself is operatively associated with the camera film speed setting dial 8 and is displaceable in accordance with the set ASA speed value. On the other hand, the slider is operatively associated with the first lever 4 of the lens 2 and is slidable on said resistance element in the direction opposite to the direction of displacement of the resistance element in accordance with the difference $A_{vo} - A_v$ between the maximum aperture value $A_{vo}$ and the preset aperture value $A_v$. Thus, the resistance value of the entire resistor $R_1$ exhibits a value corresponding to $S_v + A_{vo} - A_v$. Of course, the variable resistor $R_1$ may alternatively be provided by series-connecting a variable resistor operatively associated with the setting dial 8 and exhibiting a resistance value corresponding to $S_v$ and a variable resistor operatively associated with the first lever 4 and exhibiting a resistance value corresponding to $A_{vo} - A_v$.

Figure 3:
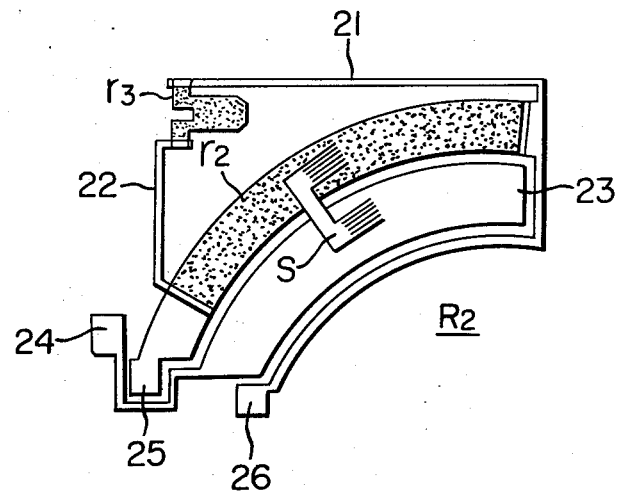
FIG. 3 is a substantially plan view of a variable resistor which is a component of an embodiment of the present invention.

The second variable resistor $R_2$ comprises a resistance element $r_2$ and a slider S, as shown in FIG. 3. The slider S is operatively associated with the second lever 5 of the lens 2 and is slidable on the resistance element $r_2$ in accordance with the maximum aperture value ($A_{vo}$). Thus, the variable resistor $R_2$ exhibits a resistance value corresponding to the difference between the resistance value of the resistor $r_2$ and the resistance value corresponding to $A_{vo}$.

Operation of the FIG. 2 circuit will now be described. It is assumed that the product of the current flowing through the resistors $R_1$ and $R_2$ and the amount of variation in resistance value per stage of $S_v$, ($A_{vo} - A_v$) and $A_{vo}$ is a voltage $V_o$ and that the potential at the junction a between the resistors $R_1$ and $R_4$ is $V_1$. Operation will be described on the assumption that the potential at an output terminal $OUT_2$ connected to the slider S when $A_{vo} = 0$ is $V_2$. Now, assuming that the voltage at the junction b between the first variable resistor $R_1$ and the second variable resistor $R_2$ is $Vout_1$, $Vout_1 = V_o(S_v + A_{vo} - A_v) + V_1$ while, on the other hand, assuming that the potential of the slider S of the second variable resistor $R_2$ is $Vout_2$, $Vout_2 = V_o(S_v + A_{vo} - A_v) + V_1 + V_2 - V_o \cdot A_{vo} = V_{o'}(S_v - A_v) + V_1 + V_2$. That is, $Vout_1$ is varied corresponding to $S_v + A_{vo} - A_v$ and $Vout_2$ is varied corresponding to $S_v - A_v$. The voltage $Vout_1$ is transmitted from the output terminal $OUT_1$ to the exposure time control circuit 7. The voltage $Vout_2$ is transmitted from the output terminal $OUT_2$ to the quantity-of-light control circuit 9 and the light adjustment detection circuit 10 of the flash unit.

The variation per stage in maximum aperture value $A_{vo}$ by the second variable resistor $R_2$ must be identical to the absolute value of the amount of variation per stage in the exposure parameters of the first variable resistor $R_1$, and a correction resistor $R_3$ is used for the correction of these when they are not identical. That is, the correction resistor $R_3$ divides the current flowing into the second variable resistor $R_2$ so that the variation in voltage corresponding to said variation per stage is coincident with said variation per stage in the first variable resistor $R_1$ in the second variable resistor $R_2$.

In FIG. 3, the resistance element $r_3$ of the correction resistor $R_3$ is connected to the resistance element $r_2$ through conductors 21 and 22. The aforementioned voltage $Vout_2$ is obtained from the terminal 24 of a conductor 23 with which the slider S is in contact. One terminal 25 of the resistance element $r_2$ (this is at the same potential as the conductor 22) is connected to the output terminal of the OP Amp. $A_1$ and the other terminal 26 of the resistance element $r_2$ (this is at the same potential as the conductor 21) is connected to the first variable resistor $R_1$. The resistance element $r_3$ of the correction resistor $R_3$ has its resistance value determined by trimming.

What we claim is:

1. In a single lens reflex camera whose photographing lens is interchangeable, said photographing lens having a first signal member for mechanically putting out the information of an exposure parameter $A_{vo} - A_v$ ($A_{vo}$ is an APEX symbol representing an aperture value when the diaphragm of said photographing lens forms a maximum aperture and $A_v$ is an APEX symbol representing a present aperture value) and a second signal member for mechanically putting out the information of an exposure parameter $A_{vo}$, said camera being usable in combination with an electronic flash unit and having a third signal member for mechanically putting out the information of a preset exposure parameter $S_v$ (this is an APEX symbol representing the ASA speed value), an exposure time operation circuit for metering the object light passed through the maximum aperture of the diaphragm of said photographing lens and operating a proper exposure time, and a circuit for generating exposure parameter information, said exposure parameter information generating circuit comprising:
   (a) first converter means for converting the mechanical outputs of said first and third signal members into electrical output information $S_v + A_{vo} - A_v$;
   (b) second converter means for converting the mechanical output of said second signal member into electrical output information $A_{vo}$;
   (c) an adder circuit for adding the electrical outputs of said first and second converter means and electrically putting out $S_v - A_v$ information;
   (d) a first output terminal for applying the output of said first converter means to said exposure time operation circuit; and
   (e) a second output terminal for applying the output of said adder circuit to said electronic flash unit.

2. A camera according to claim 1, wherein said first converter means in said exposure parameter information generating circuit includes first resistor means exhibiting a resistance value corresponding to the mechanical outputs of said first and third signal members, said second converter means includes second resistor means exhibiting a value resulting from subtracting from a predetermined resistance value a resistance value corresponding to the mechanical output of said second signal member, and said adder circuit includes a series circuit comprising said first and second resistor means.

3. A camera according to claim 2, wherein said first resistor means of said exposure parameter information generating circuit includes:
   a first resistance element displaceable in accordance with the output of said third signal member; and
   a first slider slidable on said first resistance element in the direction opposite to the direction of displacement of said first resistance element in response to the output of said first signal member.

4. A camera according to claim 2, wherein said second resistor means of said exposure parameter information generating circuit includes:
   a second resistance element; and a second slider slidable on said second resistance element in response to the output of said second signal member.

5. A camera according to claim 4, wherein said second resistor means of said exposure information generating circuit further includes:
   a correction resistance element parallel-connected to said second resistance element.

6. A camera according to claim 1, wherein said electronic flash unit has a quantity-of-light control circuit for metering the flash light reflected from an object and for stopping the emission of light when the metered quantity of light has reached a proper exposure amount determined by exposure parameters $S_v$ and $A_v$, and said second output terminal of said exposure parameter information generating circuit is connected to said quantity-of-light control circuit.

7. A camera according to claim 1, wherein said electronic flash unit has a detection circuit for detecting whether or not said unit can emit a proper quantity of light determined by the preset distance from said unit to an object and exposure parameters $S_v$ and $A_v$, and said second output terminal of said exposure parameter information generating circuit is connected to said detection circuit.

* * * * *

UNITED STATES PATENT AND TRADEMARK OFFICE
CERTIFICATE OF CORRECTION

PATENT NO. : 4,275,953

DATED : June 30, 1981

INVENTOR(S) : SAKUJI WATANABE, ET AL.

It is certified that error appears in the above—identified patent and that said Letters Patent is hereby corrected as shown below:

Column 4, line 16, change "present" to --preset--.

Signed and Sealed this

Thirteenth Day of October 1981

[SEAL]

Attest:

Attesting Officer

GERALD J. MOSSINGHOFF

Commissioner of Patents and Trademarks